(12) United States Patent
Uchida et al.

(10) Patent No.: US 8,304,480 B2
(45) Date of Patent: *Nov. 6, 2012

(54) RUBBER COMPOSITION FOR COATING STEEL CORD AND TIRE USING THE SAME

(75) Inventors: Mamoru Uchida, Kobe (JP); Takao Wada, Kobe (JP); Tomoaki Hirayama, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 186 days.

This patent is subject to a terminal disclaimer.

(21) Appl. No.: 11/636,521

(22) Filed: Dec. 11, 2006

(65) Prior Publication Data

US 2007/0149670 A1    Jun. 28, 2007

(30) Foreign Application Priority Data

Dec. 27, 2005   (JP) ................................. 2005-374632

(51) Int. Cl.
*C08K 5/04* (2006.01)
(52) U.S. Cl. ......... 524/398; 524/430; 524/492; 524/261
(58) Field of Classification Search .................... 524/493
See application file for complete search history.

(56) References Cited

U.S. PATENT DOCUMENTS

| | | | |
|---|---|---|---|
| 3,858,635 A | 1/1975 | Nakamoto et al. | |
| 4,068,041 A * | 1/1978 | Swarts et al. | 428/625 |
| 6,713,549 B1 * | 3/2004 | Wideman et al. | 524/492 |
| 6,759,456 B2 * | 7/2004 | Kikuchi | 524/81 |
| 7,709,564 B2 * | 5/2010 | Uchida | 524/261 |
| 2001/0039986 A1 * | 11/2001 | Kaneda | 152/548 |
| 2004/0110889 A1 * | 6/2004 | Yagi et al. | 524/493 |
| 2005/0192386 A1 | 9/2005 | Miyazaki | |
| 2005/0209390 A1 | 9/2005 | Yagi et al. | |
| 2005/0215697 A1 | 9/2005 | Matsui | |

FOREIGN PATENT DOCUMENTS

| | | |
|---|---|---|
| CN | 1670062 A | 9/2005 |
| EP | 1 470 937 * | 10/2004 |
| EP | 1529803 A1 | 5/2005 |
| GB | 1122528 A | 8/1968 |
| JP | A-07/018120 | 1/1995 |
| JP | 8-230411 A | 9/1996 |
| JP | 2000-7837 A | 1/2000 |
| JP | 2000007839 A | 1/2000 |
| JP | 2000313771 A | 11/2000 |
| JP | 2003-63206 A | 3/2003 |
| JP | 2003-64222 A | 3/2003 |
| JP | 2005170970 A | 6/2005 |
| JP | 2005213483 A | 8/2005 |
| JP | 2005239874 A | 9/2005 |
| JP | 2005272815 A | 10/2005 |
| JP | 2007018120 A | 1/2007 |
| JP | 2006510790 A | 9/2007 |
| WO | WO-2004058871 | 7/2004 |

OTHER PUBLICATIONS

Machine translation of EP 1 470 937 A1.*
Japanese Office Action from Jan. 25, 2011.
English Translation of Japanese Office Action of Jan. 25, 2011.
Japanese of Action issued in corresponding Japanese Application on Aug. 16, 2011.
Japanese Office Action issued in corresponding Japanese Application on Aug. 16, 2011.
European Search Report issued on May 4, 2012, in corresponding European application No. 06025864.7.

* cited by examiner

*Primary Examiner* — Doris Lee
(74) *Attorney, Agent, or Firm* — Birch, Stewart, Kolasch & Birch, LLP

(57) ABSTRACT

A rubber composition for coating a steel cord, in which processability, durability and adhesive condition can be improved with favorable balance, and a tire using the rubber composition are provided. The rubber composition for coating a steel cord comprises 40 to 70 parts by weight of silica having a nitrogen adsorbing-specific surface area of 100 to 200 $m^2/g$, 1 to 15 parts by weight of a silane coupling agent, 12 to 20 parts by weight of zinc oxide, 3.5 to 5 parts by weight of sulfur, and an organic cobalt in an amount of 0.05 to 0.3 part by weight, converted into metal cobalt amount, on the basis of 100 parts by weight of a rubber component, and a tire is prepared using the rubber composition.

6 Claims, No Drawings

RUBBER COMPOSITION FOR COATING STEEL CORD AND TIRE USING THE SAME

BACKGROUND OF THE INVENTION

The present invention relates to a rubber composition for coating a steel cord and a tire using the rubber composition.

Generally, since a heavy load is applied to tires for an automobile, a steel cord is used as a reinforcing material. Particularly during running, if a rubber and a steel cord are peeled off due to heat generation of tires, crucial breakdown is caused on the tires.

Conventionally, carbon black is mainly used as a reinforcing filler for a rubber composition for coating a steel cord. However, in recent years, interests in environmental conservation on the earth has been increasing and automobiles are not exceptional, thus, request for improving the fuel efficiency at a low cost of tires becomes strict, and further, since petroleum resources are limited, the use of materials derived from the petroleum resources such as carbon black also has been realized to be limited, therefore, the rubber composition compounded with a material such as silica is studied. However, when silica is compounded, processability and adhesivity are deteriorated.

As a means for improving processability, a process of using specific silica is known. However, there is a problem of being inferior in reinforcing property.

As a means for improving adhesivity, a process of compounding a large amount of sulfur is known. However, free sulfur without bonding with a rubber and a steel cord becomes large in a rubber composition after vulcanization, the sulfur is degraded with heat and oxygen during using tires, and rubber strength (stress at break and elongation at break) is lowered, which causes a problem of generating coagulation failure inside of the rubber composition in a duration test.

Further, in general, a steel cord is coated with a brass-plated layer, and cupper ion and zinc ion in the brass-plated layer are reacted with sulfur in a rubber to form an adhesive layer. When the adhesive layer is formed, if the reaction proceeds too fast, a sufficiently rigid adhesive layer cannot be formed, and the adhesive condition between the rubber and the steel cord is deteriorated. On the other hand, the reaction speed is too slow, an adhesive layer is hardly formed, and the adhesive condition between the rubber and the steel cord is also deteriorated in this case as well. Therefore, in order to sufficiently improve adhesivity, it is necessary that not only sulfur is compounded in a large amount, but also this reaction speed is adjusted.

JP-A-2003-64222 discloses an ecological tire excellent in durability by having a breaker topping comprising NR, silica, a silane coupling agent, zinc oxide and sulfur, but processability and adhesive condition cannot be improved.

SUMMARY OF THE INVENTION

An object of the present invention is to provide a rubber composition for coating a steel cord, in which processability, durability and adhesive condition can be improved with favorable balance, and a tire using the rubber composition.

The present invention relates to a rubber composition for coating a steel cord comprising 40 to 70 parts by weight of silica having a nitrogen adsorbing-specific surface area of 100 to 200 m²/g, 1 to 15 parts by weight of a silane coupling agent, 12 to 20 parts by weight of zinc oxide, 3.5 to 5 parts by weight of sulfur, and 0.05 to 0.3 part by weight of organic cobalt, calculated in terms of a cobalt metal, on the basis of 100 parts by weight of a rubber component.

It is preferable that the organic cobalt is a cobalt salt of an organic acid.

It is preferable that the sulfur is an insoluble sulfur.

The present invention also relates to a tire, which comprises a steel cord coated with the rubber composition for coating a steel cord.

DETAILED DESCRIPTION

The rubber composition for coating a steel cord of the present invention comprises a rubber component, silica, a silane coupling agent, zinc oxide, sulfur and organic cobalt.

The rubber component is not particularly limited, and rubbers conventionally used in rubber industries can be used. Examples of the rubber components are a natural rubber (NR), an epoxidized natural rubber (ENR), a styrene-butadiene rubber (SBR), a butadiene rubber (BR), an isoprene rubber (IR), a butyl rubber (IIR) and a chloroprene rubber (CR), and these rubbers may be used alone, or at least two kinds thereof may be used in combination. Among these, from the viewpoint of improving low exothermic property and adhesivity with a steel cord, at least one rubber selected from the group consisting of NR, ENR and IR is preferable, and NR is more preferable.

As silica, an example is silica prepared by a wet method or a dry method, and there is no particular limitation on its preparation process.

A nitrogen adsorbing-specific surface area (BET) of silica is at least 100 m²/g, and preferably at least 120 m²/g. When BET of silica is less than 100 m²/g, reinforcing effects of durability due to compounding silica are not sufficient. Further, BET of silica is at most 200 m²/g, and preferably at most 180 m²/g. When BET of silica is more than 200 m²/g, processability is deteriorated.

An amount of silica is at least 40 parts by weight based on 100 parts by weight of the rubber component, and preferably at least 45 parts by weight. When the amount of silica is less than 40 parts by weight, reinforcing effects of durability due to compounding silica are not sufficient, and separation on an edge part (belt edge) in a belt layer is easily caused, thus, durability is insufficient. Further, the amount of silica is at most 70 parts by weight, and preferably at most 65 parts by weight. When the amount of silica is more than 70 parts by weight, processability is deteriorated, and scorch is caused on a rubber due to generating heat during kneading the rubber or generating heat in a topping step when the rubber is adhered to a steel cord, thus, adhesion reaction efficiency between the rubber and the steel cord is lowered, and separation at the belt edge is easily generated.

As a silane coupling agent used in the present invention, an example is a silane coupling agent represented by the following general formula:

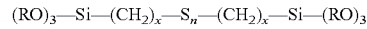

$(RO)_3—Si—(CH_2)_x—S_n—(CH_2)_x—Si—(RO)_3$ wherein R is a linear- or branched-alkyl group having 1 to 8 carbon atoms, x is an integer of 1 to 8, n is the number of sulfur atoms in a polysulfide part, and its average value is 2 to 3.

Examples of a silane coupling agent satisfying the above general formula are bis(3-triethoxysilylpropyl)polysulfide, bis(2-triethoxysilylethyl)polysulfide, bis(3-trimethoxysilylpropyl)polysulfide, bis(2-trimethoxysilylethyl)polysulfide, bis(4-triethoxysilylbuyl)polysulfide, and bis(4-trimethoxysilylbutyl)polysulfide, and these silane coupling agents may be used alone, or at least two kinds thereof may be used in combination. By containing such silane coupling agents, deterioration of processability can be suppressed.

An amount of the silane coupling agent is at least 1 part by weight based on 100 parts by weight of the rubber component, and preferably at least 2 parts by weight. When the amount of the silane coupling agent is less than 1 part by weight, silica can not be sufficiently dispersed during kneading, thus, a viscosity of an unvulcanized rubber composition is increased, and processability is deteriorated. Further the amount of the silane coupling agent is at most 15 parts by weight, and preferably at most 10 parts by weight. When the amount of the silane coupling agent is more than 15 parts by weight, improvement effects of dispersibility of silica due to increasing an amount of the silane coupling agent are small, and further, since the silane coupling agent is excessively compounded, economical efficiency is inferior.

As zinc oxide, zinc oxide conventionally used in rubber industries may be used, and an example of such zinc oxide is zinc oxide No. 1 or No. 2 available from Mitsui Mining & Smelting Co., Ltd.

An amount of zinc oxide is at least 12 parts by weight based on 100 parts by weight of the rubber component, and preferably at least 13 parts by weight. When the amount of zinc oxide is less than 12 parts by weight, adhesion strength with a steel cord is lowered, and durability of a belt layer is deteriorated. Further, the amount of zinc oxide is at most 20 parts by weight, and preferably at most 18 parts by weight. When the amount of zinc oxide is more than 20 parts by weight, dispersibility of zinc oxide is lowered, and durability of the belt layer is deteriorated.

As sulfur used in the present invention, insoluble sulfur is preferable from the viewpoints that blooming of sulfur on the rubber surface is inhibited, adhesivity of the rubber composition is improved, and adhesion failure at a belt edge part during preparation of a tire can be suppressed, and specific examples of insoluble sulfur are CRYSTEX HSOT20 available from Flexsys Co., and Sanfel EX available from SANSHIN CHEMICAL INDUSTRY CO., LTD.

An amount of sulfur is at least 3.5 parts by weight based on 100 parts by weight of the rubber component, and preferably at least 4.0 parts by weight. When the amount of sulfur is less than 3.5 parts by weight, adhesion strength with a steel cord is lowered, and durability is inferior. Further, the amount of sulfur is at most 5 parts by weight. When the amount of sulfur is more than 5 parts by weight, thermal degradation resistance is deteriorated, and further, since blooming that is precipitation of insoluble sulfur which is not dissolved in the rubber on the rubber surface is easily generated due to compounding a large amount of sulfur, strict temperature control is required during kneading, and productivity is lowered. When insoluble sulfur is compounded as sulfur, an amount of sulfur indicates an amount of sulfur excluding an oil content in the insoluble sulfur.

As organic cobalt, a cobalt salt of an organic acid such as cobalt naphthenate, cobalt stearate, cobalt oleate and cobalt maleate are preferably used from the viewpoints of having functions of adjusting a speed of elution of copper and zinc of the brass-plated layer in a rubber and controlling quality of an adhesive layer which is formed by reacting copper ion and zinc ion with sulfur in a rubber. Depending on kind of acids, a breakage of a rubber molecule in the unvulcanized state is caused due to oxidation of a metal cobalt, thus, strength at break and elongation at break of the rubber after vulcanization are lowered and separation resistance performance is deteriorated. From the viewpoint that such problems hardly arise, cobalt naphthenate and cobalt stearate are preferable, and cobalt stearate is more preferable. Further, these organic cobalts may be used alone, or at least two kinds thereof may be used in combination.

An amount of organic cobalt is preferably at least 0.05 part by weight, converted into metal cobalt amount on the basis of 100 parts by weight of the rubber component, and more preferably at least 0.1 part by weight. When the amount of organic cobalt is less than 0.05 part by weight, a reaction between a brass-plated layer of a steel cord and sulfur becomes fast, and sufficiently rigid adhesive layer is not formed, thus, condition of adhesion between the rubber and the cord is deteriorated. Further, the amount of organic cobalt is at most 0.3 part by weight, preferably at most 0.2 part by weight, and more preferably at most 0.18 part by weight. When the amount of organic cobalt is more than 0.3 part by weight, adversely, the reaction between the brass-plated layer and sulfur in a rubber is suppressed and an adhesive layer is hardly formed, thus, conditions of adhesion between the rubber and the cord tends to be deteriorated.

In the present invention, heat resistance and durability can be improved while maintaining adhesion strength by comprising specific amounts of the above-described rubber component, silica, silane coupling agent, zinc oxide and sulfur, and further comprising organic cobalt.

The rubber composition for coating a steel cord of the present invention can further contain an antioxidant.

Examples of the antioxidant are amine derivatives such as diphenylamines and p-phenylenediamines, quinoline derivatives, hydroquinone derivatives, monophenols, diphenols, thiobisphenols, hindered phenols and phosphate esters.

An amount of the antioxidant is preferably at least 1 part by weight based on 100 parts by weight of the rubber component, and more preferably at least 2 parts by weight. When the amount of the antioxidant is less than 1 part by weight, effects of suppressing rubber oxidation are not sufficient, rubber degradation proceeds due to generating heat by running, and separation resistance performance at a belt edge part tends to be deteriorated. Further, the amount of the antioxidant is preferably at most 4 parts by weight, and more preferably at most 3 parts by weight.

The rubber composition for coating a steel cord of the present invention can be suitably compounded of various vulcanization accelerators in addition to the above-described rubber component, silica, silane coupling agent, zinc oxide, sulfur, organic cobalt and antioxidant.

The rubber composition for coating a steel cord of the present invention is prepared by general processes. Namely, the rubber composition for coating a steel cord of the present invention can be prepared by kneading the above-described compounding agents by, for example, a banbury mixer, a kneader, or an open roll, and then vulcanizing thereof.

A tire of the present invention is preferably prepared by the following steps (1) to (3).

In the step (1), it is preferable to compound and knead the above-described rubber component, silica, silane coupling agent, zinc oxide, and organic cobalt by using a banbury mixer etc.

In the step (1), these components can be kneaded with compounding various antioxidants.

A kneading temperature in the step (1) is preferably at least 140° C., and more preferably at least 145° C. When the kneading temperature is less than 140° C., a reaction of the silica and silane coupling agent does not proceed, it is difficult to disperse the silica in the rubber, and the kneading time tends to be long. Further, the kneading temperature is preferably at most 160° C., and more preferably at most 155° C. When the kneading temperature is more than 160° C., sulfur atoms contained in the silane coupling agent initiates a reaction with a rubber, and a viscosity of an unvulcanized rubber composition is increased, and processability tends to be deteriorated.

In the step (2), it is preferable to prepare the unvulcanized rubber composition by compounding sulfur and kneading, using an open roll etc.

In the step (2), various vulcanization accelerators can be compounded and kneaded.

In the step (3), it is preferable that a steel cord is coated with the unvulcanized rubber composition discharged in the step (2), the steel cord coated with the unvulcanized rubber composition is processed by press-rolling, adjusting to a shape of a belt layer, and molded with other respective parts on a tire molding machine by a general process, thereby, an unvulcanized tire is formed, and this unvulcanized tire is heated and pressurized in a vulcanizer.

As described above, a tire comprising a steel cord coated with the rubber composition for coating a steel cord of the present invention can be prepared by the steps (1) to (3).

EXAMPLES

The present invention is specifically explained based on Examples, however, the present invention is not only limited thereto.

Various chemicals used in Examples and Comparative Examples are collectively explained in the following.
Natural rubber (NR): TSR20
Silica 1: Ultrasil VN3 (BET:175 m$^2$/g) available from Degussa Co.
Silica 2: Z85 (BET:83 m$^2$/g) available from Rhodia Co.
Silica 3: Z215 (BET:248 m$^2$/g) available from Rhodia Co.
Silane coupling agent: Si75 (bis(triethoxysilylpropyl)disulfide) available from Degussa Co.
Antioxidant: NOCRAC 6C (N-1,3-dimethylbutyl-N'-phenyl-p-phenylenediamine) available from Ouchi Shinko Chemical Industrial CO., LTD
Cobalt stearate: (containing 9.4% by weight of cobalt element) available from Japan Energy Corporation.
Cobalt naphthenate: (containing 10% by weight of cobalt element) available from Dainippon Ink and Chemicals Industrial, Incorporated.
Zinc oxide: Zinc oxide No. 1 available from Mitsui Mining & Smelting Co., Ltd.
Sulfur: CRYSTEX HSOT20 (insoluble sulfur containing 80% by weight of sulfur and 20% by weight of an oil content) available from Flexsys Co.
Vulcanization accelerator: NOCCELER DZ (N,N'-dicyclohexyl-2-benzothiazolylsulfenamide) available from Ouchi Shinko Chemical Industrial Co., Ltd.

Examples 1 to 6 and Comparative Examples 1 to 10

According to the compounding prescriptions shown in Table 1, chemicals other than sulfur and a vulcanization accelerator were kneaded for 3 minutes under a temperature at 150° C., using a Banbury mixer to obtain a kneaded product. Then, the sulfur and vulcanization accelerator were added to the obtained kneaded product and kneaded for 5 minutes under a temperature at 95° C., using an open roll, and an unvulcanized rubber composition was obtained. Further, a steel cord was molded into a belt-like shape by coating the steel cord with the obtained unvulcanized rubber composition to prepare an unvulcanized belt, the unvulcanized belt was laminated with other tire parts and vulcanized under a temperature at 170° C. for 15 minutes, thereby, tires for tests in Examples 1 to 6 and Comparative Examples 1 to 10 (tire size: 195/65R15) were prepared.

(Mooney Viscosity Test)

A test piece having a specified size was prepared from the above-described unvulcanized rubber composition, and according to JIS K 6300 "Test Method of Unvulcanized Rubbers", by using a Mooney viscosity tester manufactured by Shimadzu Corporation, a small rotor was rotated under the temperature condition of 130° C. heated by preheating for 1 minute to measure a Mooney viscosity of the unvulcanized rubber composition after a lapse of 4 minutes. Further, a Mooney viscosity of each composition was expressed as an index by the following calculation formula, assuming the Mooney viscosity index of Example 1 as 100. It indicates that the smaller the Mooney viscosity is, the more excellent processability is.

(Mooney viscosity index)=(Mooney viscosity of each composition)÷(Mooney viscosity of Example 1)×100

(Durability Test)

Under the condition of 140% load according to JIS, the prepared tire was run 60,000 km in a drum (drum running) at a speed of 80 km/h. Then, the tire was cut off at 8 points on the circumference of the tire in the radial direction, lengths of separation occurred at a belt edge and a neighboring belt edge on a cut section were summed, and separation resistance performance of each composition was expressed as an index by the following calculation formula, assuming the durability index of Example 1 as 100. It indicates that the smaller the separation resistance performance index is, the more excellent durability is.

(Separation resistance performance index)=(Separation length of each composition)÷(Separation length of Example 1)×100

(Adhesive Condition)

Under the condition of 140% load according to JIS, the prepared tire was run 60,000 km in a drum (drum running) at a speed of 80 km/h. Then, a belt layer was taken out of the tire, a rubber piece for an adhesion peeling test having a width of 25 mm was prepared, and the belt layer and a neighboring belt layer were peeled off at a tensile speed of 50 mm/min. Further, a ratio of a part of a steel cord coated with the rubber composition on the peeling surface was calculated. It indicates that the larger the ratio is, the stronger adhesion strength of the rubber composition with the steel cord, which is in an excellent adhesive condition.

Results of the above test are shown in Table 1.

TABLE 1

|  | Ex. | | | | | | Com. Ex. | | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 | 9 | 10 |
| Amounts (part by weight) | | | | | | | | | | | | | | | | |
| NR | 100 | 100 | 100 | 100 | 100 | 100 | 100 | 100 | 100 | 100 | 100 | 100 | 100 | 100 | 100 | 100 |
| Silica 1 | 55 | 55 | 55 | 55 | 60 | 60 | 55 | 55 | 55 | 85 | 35 | 55 | — | — | 55 | 55 |
| Silica 2 | — | — | — | — | — | — | — | — | — | — | — | — | 55 | — | — | — |
| Silica 3 | — | — | — | — | — | — | — | — | — | — | — | — | — | 55 | — | — |
| Silane coupling agent | 4 | 4 | 4 | 4 | 4.4 | 4.4 | 4 | 4 | 4 | 4 | 4 | 4 | 4 | 4 | 4 | 4 |
| Antioxidant | 3 | 3 | 3 | 3 | 3 | 3 | 3 | 3 | 3 | 3 | 3 | 3 | 3 | 3 | 3 | 3 |
| Cobalt stearate | 1.5 | — | 2.5 | 1.5 | 1.5 | 1 | 1.5 | 1.5 | 1.5 | 1.5 | 1.5 | 1.5 | 1.5 | 1.5 | 0.5 | 3.5 |
| Cobalt naphthenate | — | 1.5 | — | — | — | — | — | — | — | — | — | — | — | — | — | — |
| Zinc oxide | 15 | 15 | 15 | 15 | 15 | 15 | 15 | 8 | 25 | 15 | 15 | 15 | 15 | 15 | 15 | 15 |
| Sulfur | 6.1 | 6.1 | 6.1 | 5 | 6.1 | 5 | 7.5 | 6.1 | 6.1 | 6.1 | 6.1 | 3.8 | 6.1 | 6.1 | 6.1 | 6.1 |
| Vulcanization accelerator | 1 | 1 | 1 | 1 | 1 | 1 | 1 | 1 | 1 | 1 | 1 | 1 | 1 | 1 | 1 | 1 |
| Evaluations | | | | | | | | | | | | | | | | |
| Mooney viscosity index | 100 | 100 | 96 | 101 | 105 | 106 | 101 | 99 | 105 | 140 | 75 | 100 | 70 | 120 | 102 | 86 |
| Separation resistance performance index | 100 | 95 | 105 | 105 | 95 | 100 | 130 | 145 | 135 | 95 | 280 | 300 | 210 | 95 | 420 | 135 |
| Adhesive condition | 100 | 100 | 100 | 100 | 100 | 100 | 100 | 75 | 100 | 100 | 100 | 70 | 100 | 100 | 10 | 80 |

In Examples 1 to 6 in which specific amounts of silica, a silane coupling agent, zinc oxide, sulfur and organic cobalt were contained, processability, durability and adhesive conditions can be improved with favorable balance.

In any of Comparative Examples 1 to 3 and 6, in which amounts of sulfur and zinc oxide were out of the specified range, durability was inferior.

In Comparative Examples 4 and 8, in which an amount or $N_2SA$ of silica was large, processability is inferior, and in Comparative Examples 5 and 7, in which an amount or $N_2SA$ of silica is small, durability was inferior.

In Comparative Examples 9 and 10, in which an amount of organic cobalt is out of the specified range, both durability and adhesive condition were inferior.

According to the present invention, a rubber composition for coating a steel cord, in which processability, durability and adhesive condition can be improved with favorable balance, and a tire using the same can be provided by comprising specified amounts of a rubber component, specific silica, a silane coupling agent, zinc oxide and sulfur, and further comprising organic cobalt.

What is claimed is:

1. A tire having a steel cord, wherein the steel cord is coated with a rubber composition comprising:
    40 to 70 parts by weight of silica having a nitrogen adsorbing-specific surface area of 100 to 200 $m^2/g$;
    1 to 15 parts by weight of at least one silane coupling agent selected from the group consisting of bis(3-triethoxysilylpropyl)polysulfide, bis(2-triethoxysilylethyl)polysulfide, bis(3-trimethoxysilylpropyl)polysulfide, bis(2-trimethoxysilylethyl)polysulfide, bis(4-triethoxysilylbuyl)polysulfide, and bis(4-trimethoxysilylbutyl)polysulfide;
    12 to 20 parts by weight of zinc oxide;
    3.5 to 5 parts by weight of sulfur; and
    a cobalt salt of an organic acid in an amount of 0.05 to 0.3 parts by weight converted into the metal cobalt amount, on the basis of 100 parts by weight of a natural rubber, and carbon black is not contained in the rubber composition.

2. The tire of claim 1, wherein said sulfur is an insoluble sulfur.

3. The tire of claim 1, wherein the silica is present in an amount of 45 to 65 parts by weight;
    the zinc oxide is present in an amount of 13 to 18 parts by weight; and
    the sulfur is present in an amount of 4.0 to 5 parts by weight.

4. The tire of claim 1, wherein said cobalt salt of an organic acid is selected from the group consisting of cobalt naphthenate, cobalt stearate, cobalt oleate and cobalt maleate.

5. The tire of claim 1, wherein said sulfur is an insoluble sulfur; and wherein said cobalt salt of an organic acid is selected from the group consisting of cobalt naphthenate, cobalt stearate, cobalt oleate and cobalt maleate.

6. The tire of claim 5, wherein the silica is present in an amount of 45 to 65 parts by weight; the zinc oxide is present in an amount of 13 to 18 parts by weight; and the sulfur is present in an amount of 4.0 to 5 parts by weight.

* * * * *